(12) United States Patent
Krishnaswamy et al.

(10) Patent No.: US 9,819,794 B2
(45) Date of Patent: Nov. 14, 2017

(54) DYNAMIC SELECTION OF COMMUNICATION MODE, APPLICATION, AND/OR DEVICE USING CONTEXT AND POLICY

(71) Applicant: Avaya Inc., Santa Clara, CA (US)

(72) Inventors: Venkatesh Krishnaswamy, Holmdel, NJ (US); Kundan Singh, San Francisco, CA (US); Stephen Brock, Morrisville, NC (US); Joyce Fong, Palo Alto, CA (US); Laurent Philonenko, San Francisco, CA (US)

(73) Assignee: Avaya Inc., Santa Clara, CA (US)

( * ) Notice: Subject to any disclaimer, the term of this patent is extended or adjusted under 35 U.S.C. 154(b) by 174 days.

(21) Appl. No.: 14/717,060

(22) Filed: May 20, 2015

(65) Prior Publication Data
US 2016/0344867 A1    Nov. 24, 2016

(51) Int. Cl.
| | |
|---|---|
| H04L 12/16 | (2006.01) |
| H04M 3/42 | (2006.01) |
| H04L 29/06 | (2006.01) |
| H04M 3/53 | (2006.01) |
| H04M 3/54 | (2006.01) |
| H04M 3/56 | (2006.01) |
| H04M 15/00 | (2006.01) |

(52) U.S. Cl.
CPC .... *H04M 3/42263* (2013.01); *H04L 65/1096* (2013.01); *H04M 3/42357* (2013.01); *H04M 3/42374* (2013.01); *H04M 3/53* (2013.01); *H04M 3/54* (2013.01); *H04M 3/56* (2013.01); *H04M 15/882* (2013.01)

(58) Field of Classification Search
None
See application file for complete search history.

(56) References Cited

U.S. PATENT DOCUMENTS

| | | | | |
|---|---|---|---|---|
| 7,023,979 | B1 * | 4/2006 | Wu | H04M 3/5233 379/265.11 |
| 8,180,933 | B2 * | 5/2012 | Krantz | H04L 12/1818 455/415 |
| 8,463,939 | B1 * | 6/2013 | Galvin | H04L 65/1063 379/265.01 |
| 9,264,667 | B1 * | 2/2016 | Mande | H04N 7/15 |

(Continued)

*Primary Examiner* — Michael J Moore, Jr.
(74) *Attorney, Agent, or Firm* — Sheridan Ross P.C.

(57) ABSTRACT

The system and method identify contact information for a first party. The contact information for the first party includes a plurality of communication endpoints of the first party and a plurality of communication applications for the plurality of communication endpoints of the first party. For example, the plurality of communication endpoints may be a home phone and a cell phone of the first party. The plurality of communication applications may be voice, video, text, and/or virtual reality applications of the first party. An electronic communication request is received from the first party to the second party. In response to receiving the electronic communication request from the first party to the second party, a first communication endpoint of the plurality of communication endpoints for the first party and a first communication application of the plurality of communication applications of the first party is selected based on a rule.

19 Claims, 4 Drawing Sheets

(56) References Cited

U.S. PATENT DOCUMENTS

| | | | |
|---|---|---|---|
| 9,420,002 B1* | 8/2016 | McGovern | H04L 63/10 |
| 2002/0093941 A1* | 7/2002 | Strathmeyer | H04L 29/06027 |
| | | | 370/351 |
| 2008/0109517 A1* | 5/2008 | Sarkar | G06Q 10/109 |
| | | | 709/206 |
| 2008/0163075 A1* | 7/2008 | Beck | H04L 51/12 |
| | | | 715/759 |
| 2010/0239077 A1* | 9/2010 | Michaelis | H04L 63/029 |
| | | | 379/93.02 |
| 2011/0194683 A1* | 8/2011 | Wilson | G06Q 10/109 |
| | | | 379/202.01 |
| 2012/0239822 A1* | 9/2012 | Poulson | H04L 41/0668 |
| | | | 709/239 |
| 2013/0086481 A1* | 4/2013 | Balasaygun | G06F 3/0481 |
| | | | 715/745 |
| 2013/0132854 A1* | 5/2013 | Raleigh | G06F 3/0482 |
| | | | 715/738 |
| 2014/0136718 A1* | 5/2014 | Menezes | H04L 65/1083 |
| | | | 709/227 |
| 2015/0024725 A1* | 1/2015 | Lang | H04M 1/72572 |
| | | | 455/417 |
| 2016/0337819 A1* | 11/2016 | Malatack | H04W 4/06 |

* cited by examiner

DYNAMIC SELECTION OF COMMUNICATION MODE, APPLICATION, AND/OR DEVICE USING CONTEXT AND POLICY

TECHNICAL FIELD

The systems and methods disclosed herein relate to communication systems and in particular to selection of optimal communication modes, applications, and devices.

BACKGROUND

Existing communications applications tend to create islands of users that do not always efficiently communicate with each other. In order to efficiently communicate, the communication applications often require expensive pair-wise federation among application providers. Moreover, with existing applications, the parties of the communication session are typically locked into static communication modes, applications, and communication devices when a communication session is initiated. If the party initiates a voice call, the call is typically routed to a voice communication device. This can lead to less than optimal communications between a calling party and a called party. For example, if a called party is not available via voice, the communication session may not be completed even though the called party may be available through a different communication medium.

To overcome this problem, some present day communication applications are capable of determining presence information of a called party. For example, if a call is made to the called party's desktop telephone, the call may be re-routed to the called party's cell phone based on the called party being present at the cell phone and not present at the desktop telephone. While this type of service does provide more efficient communications, it still falls short in many instances because the called party cannot be reached effectively.

SUMMARY

Systems and methods are provided to solve these and other problems and disadvantages of the prior art. The system and method identify contact information for a first party. The contact information for the first party defines a plurality of communication endpoints of the first party and a plurality of communication applications for the plurality of communication endpoints of the first party. For example, the plurality of communication endpoints may be a home phone and a cell phone of the first party. The plurality of communication applications may be voice, video, text, and/or virtual reality applications of the first party. An electronic communication request is received from the first party to the second party. In response to receiving the electronic communication request from the first party to the second party, a first communication endpoint of the plurality of communication endpoints for the first party and a first communication application of the plurality of communication applications of the first party is selected based on a rule.

DETAILED DESCRIPTION

Figure 1:
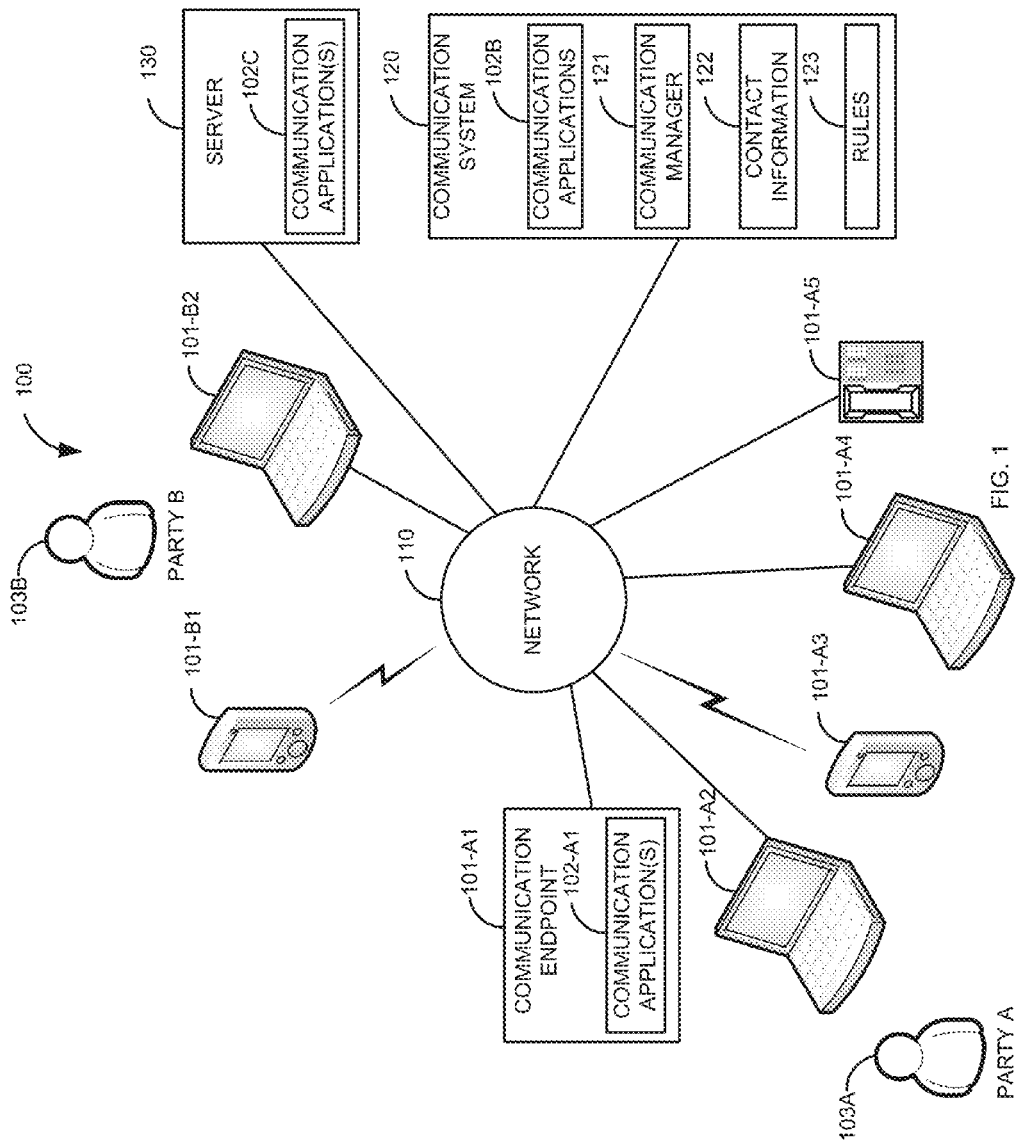
FIG. 1 is a block diagram of a first illustrative system for selecting a communication endpoint and a communication application for a party that initiated an electronic communication.

FIG. 1 is a block diagram of a first illustrative system 100 for selecting a communication endpoint 101 and a communication application 102 for a party 103 that initiated an electronic communication. The first illustrative system 100 comprises communication endpoints 101-A1 to 101-A5, communication endpoints 101-B1 to 101-B2, a network 110, a communication system 120, and a server 130. In addition, FIG. 1 has two parties 103A and 103B.

The communication endpoint 101 can be or may include any communication endpoint 102 that can communicate on the network 110, such as a Personal Computer (PC), a telephone, a video system, a cellular telephone, a Personal Digital Assistant (PDA), a tablet device, a notebook device, and the like. Although not shown in FIG. 1, any number of communication endpoints 101 may be connected to the network 110. In addition, the communication endpoint 101 may be directly connected to the communication system or connected via another network 110.

In FIG. 1, the communication endpoints 101 are identified based a party 103 associated with the communication endpoint 101. The communication endpoints 101-A1 to 101-A5 are communication endpoints 101 associated with the party 103A. For example, the communication endpoint 101-A1 is a home telephone of the party 103A and the communication endpoint 101-A2 is a home Personal Computer (PC) of the party 103A. The communication endpoint 101-A3 is the party 103A's cell phone, the communication endpoint 101-A4 is the party 103A's work PC, and the communication endpoint 101-A5 is the party 103A's work telephone.

The communication endpoints 101-B1 to 101-B2 are communication endpoints 101 associated with the party 103B. For example, the communication endpoint 101-B1 may be the party 103B's cell phone and the communication endpoint 101-B2 may be the party 103B's home PC. Although not shown, the parties 103A and 103B may include additional parties 103 and/or any number of additional communication endpoints 101 associated with any of the parties 103.

A party 103 is typically a person. However, a party 103 is not limited to a person. For example, a party 103 to a communication session may be an Interactive Voice Response (IVR) system, an auto dialer, a voice mail application, a conference bridge, a call recorder, and/or the like.

The communication endpoint 101-A1 also comprises one or more communication applications 102-A1. The communication application 102-A1 can be or may include any type of communication application for electronic communications, such as a voice communication application, a video communication application, a text messaging application, an Instant Messaging (IM) application, an email application, a virtual reality application, and/or the like. Although not shown, the remaining communication endpoints 101 may also include any number of communication application 102, including zero communication applications 102.

In other embodiments, the communication application 102 may be in the communication system 120 (102B) and/or the server 130 (102C). For example, the communication application 102C may be an email application that runs on the server 130, which is a web server. Alternatively, the communication application 102 may be a distributed communication application 102. For example, the communication application 102 may be a voice communication application 102 that is distributed between the communication endpoints 101 and the communication system 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, text messaging protocols, Instant Messaging (IM) protocols, and/or the like. Thus, the network 110 is an electronic communication network configured to carry messages via packets and/or circuit switched communications.

The communication system 120 can be or may include any hardware/software that can manage various types of communications, such as a Private Branch Exchange (PBX), a central office switch, a router, an email system, a text messaging system, a video server, a voice system, an IM system, and/or the like. The communication system 120 further comprises the communication application 102B, a communication manager 121, contact information 122, and rules 123.

The communication manager 121 can be any hardware/software that can route communications, such as a PBX, a central office switch, a router, a session manager, a proxy server, and/or the like. The communication manager 121 can manage a variety of communication, such as voice, video, text, IM, and email communications.

The contact information 122 can include a variety of contact information 122 for the parties 103. For example, Table 1 is an exemplary list a list of contact information 122 for the party 103A and the party 103B of FIG. 1.

TABLE 1

| End-point 101 | Party 103 | Type | Communication Application(s) 102 | Application Provider |
|---|---|---|---|---|
| 101-A1 | 103A | Home Phone | Voice | Company A - 208-111-2222 |
| 101-A2 | 103A | Home PC | IM | Company B - a@companyb.com |
| | | | Email | Company C - a@companyc.com |
| 101-A3 | 103A | Cell Phone | Voice | Company A - 208-333-4444 |
| | | | IM | Company B - a@companyb.com |
| | | | Email | Company B - a@companyb.com |
| | | | Text | Company A - 208-333-4444 |
| | | | Video | Company D - a@companyd.com |
| 101-A4 | 103A | Work PC | IM | Company E - a@companye.com |
| | | | Email | Company E - a@companye.com |
| | | | Video | Company E - a@companye.com |
| | | | Virtual Reality | Company E - a@companye.com |
| 101-A5 | 103A | Work Phone | Voice | Company E - 208-555-6666 |
| 101-B1 | 103B | Cell Phone | Voice | Company A - 208-777-8888 |
| | | | IM | Company A - b@companya.com |
| | | | Email | Company A - b@companya.com |
| | | | Text | Company A - 208-777-8888 |
| | | | Video | Company D - b@companyd.com |
| 101-B2 | 103B | Home PC | Email | Company B - b@companyb.com |

The contact information 122 may include the communication endpoint 101, the associated party 103, the type of device, the communication applications 102 supported by the endpoint 101, an application provider, an address for the party 103 using the application (e.g., a telephone number, email address, etc.), a physical address of the party 103, and/or the like. The contact information 122 is used to select the appropriate contact medium (e.g., voice, video, text), the appropriate communication application 102 for that medium (e.g., which email application to use), and communication endpoint 101.

The types of communication endpoints 101 described in Table 1 are not limiting. For example, the communication endpoint 101 may be a work telephone, a home telephone, a mobile telephone, a home PC, a work PC, a home video phone, a work video phone, a mobile video phone, a pager, and a personal digital assistant, and/or the like.

The communication applications 102 defined in Table 1 are not limiting. For example, the communication application 102 may be a work voice application, a home voice application, a mobile telephone voice application, a work video application, a home video application, a mobile video application, an work email application, a personal email application, a mobile email application, a work text messaging application, a home text messaging application, a mobile text messaging application, a work Instant Messaging (IM) application, a home IM application, a mobile IM application, and a work multimedia application, a home multimedia application, a mobile multimedia application, a work virtual reality application, a mobile virtual reality application, a home virtual reality application, a paging application, a FAX application, a IVR application, a voice mail application, a conference bridge, and/or the like.

The rules 123 are a set of rules that are defined for one or more parties 103 in an electronic communication session. For example, the rule 123 may be for a party 103 that initiates or a voice call, for the party 103 receiving the voice call, or both parties 103. The rules 123 can be for multiple parties 103 of a conference call. For example, if there are three or more parties 103 to a conference call, each party 103 to the conference call may have different rules 123. Alternatively, two or more parties 103 may share one or more rules 123. The rules 123 can be based on a receipt of a communication request, based on an event that occurs during a communication session, based on the communication session ending, and/or the like. The rules 123 may be based on various criteria, such as presence of the party 103, presence of a party at a communication endpoint 101, location of the party 103, a preferred contact medium based on a time, a location, a calendar event, etc., an activity of the party 103 (e.g., on a call, in a meeting, driving, eating, sleeping, traveling, on vacation, at work, at home, at lunch, with a specific person, on leave, etc.), a call type (e.g., transferred, forked, forwarded, conferenced, etc.), any combination of these, and the like.

In the above description, the various elements, such as the communication applications 102, the communication manager 121, the contact information 122, and the rules 123 are shown as part of the communication system 120. However, in other embodiments, the communication applications 102, the communication manager 121, the contact information 122, and the rules 123 may be distributed and/or in other elements. For example, in a peer-to-peer configuration, the communication manager 121, the contact information 122, and the rules 123 may reside in the communication endpoints 101.

Figure 2:
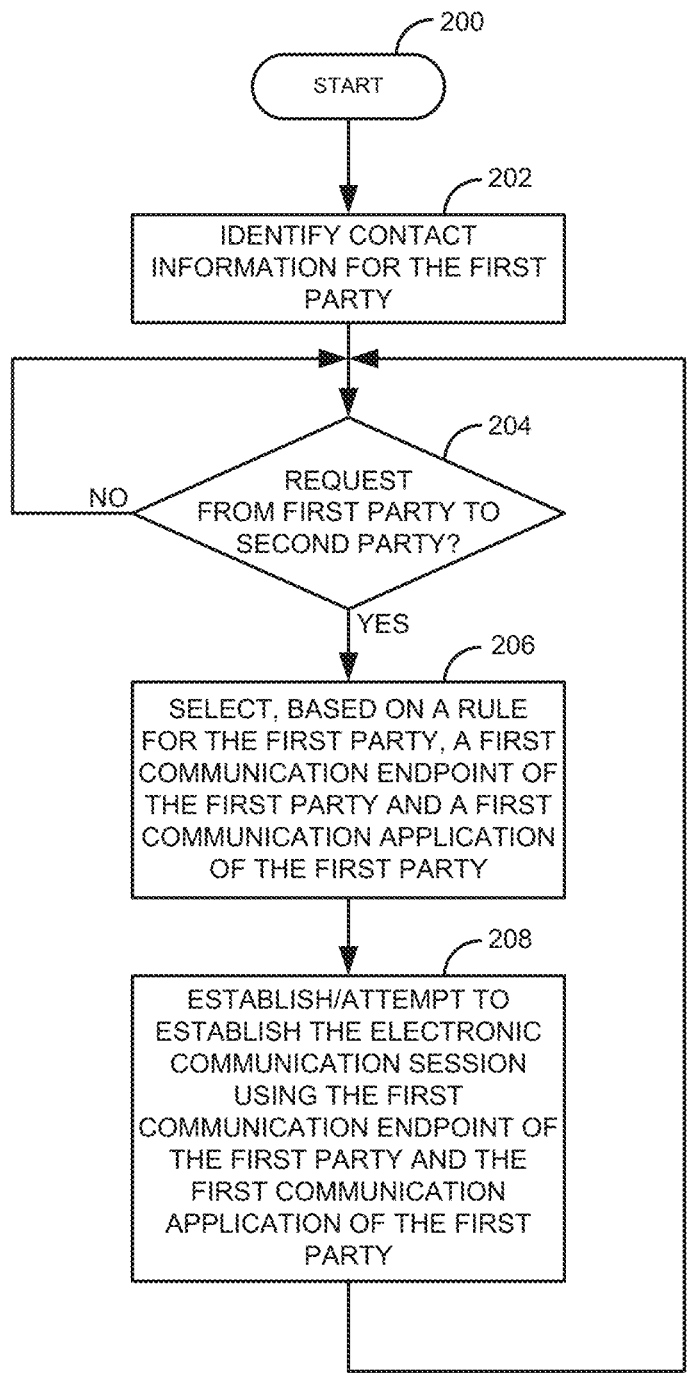
FIG. 2 is a flow diagram of a process for selecting a communication endpoint and a communication application for a party that initiated an electronic communication.
Figure 3:
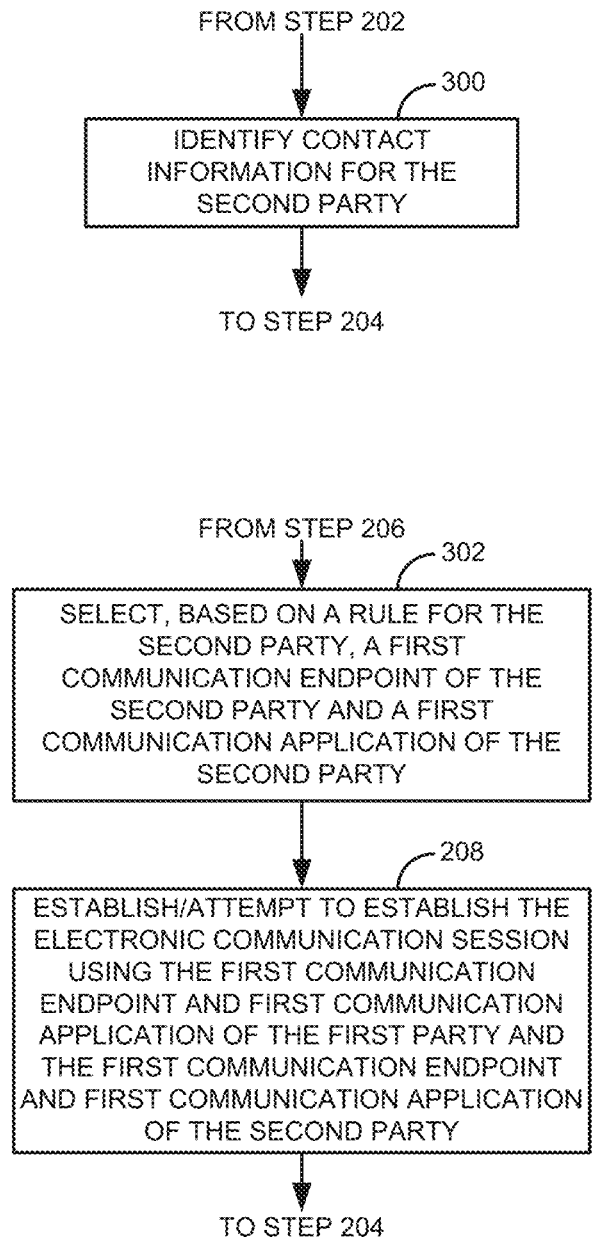
FIG. 3 is a flow diagram of a process for selecting a communication endpoint and a communication application for a called party in an electronic communication.
Figure 4:
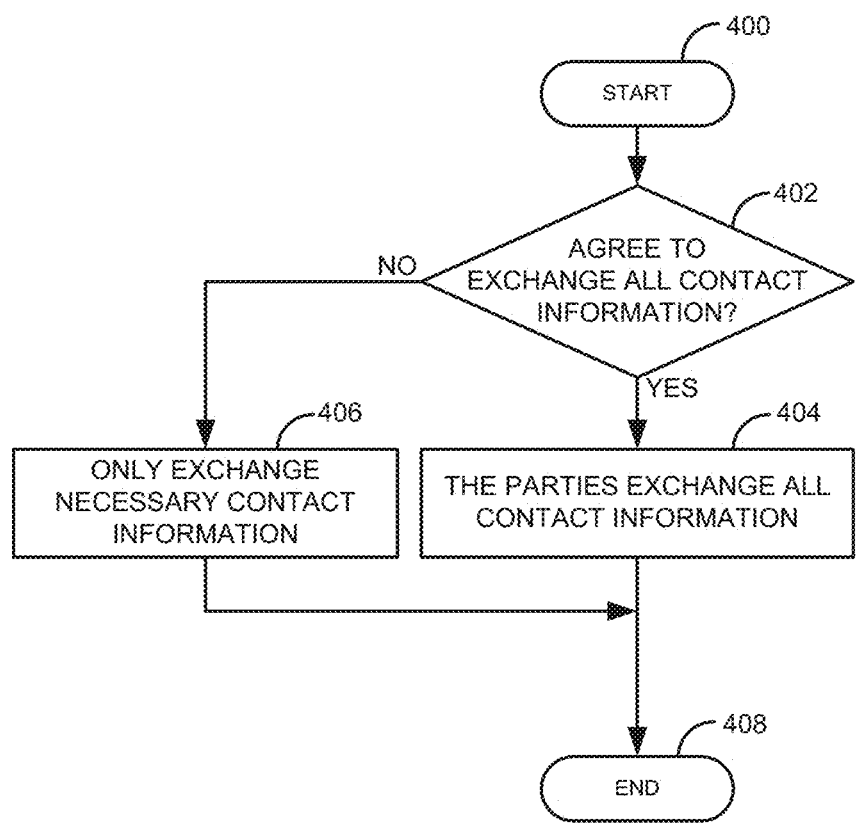
FIG. 4 is a flow diagram of a process for exchanging contact information between parties.

FIG. 2 is a flow diagram of a process for selecting a communication endpoint 101 and a communication application 102 for a party 103 that initiated an electronic communication. Illustratively, the communication endpoints 101, the communication applications 102, the communication system 120, the communication manager 121, and the server 130 are stored-program-controlled entities, such as a computer or processor, which performs the method of FIGS. 2-4 and the processes described herein by executing program instructions stored in a non-transitory computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The communication manager 121 identifies contact information 122 for the first party 103A in step 202. For example, the contact information 122 of the party 103A may be as described in Table 1. In table 1, the first party 103A has five different communication endpoints 101-A1 to 101-A5. The first party 103A has six different modes of communication (voice, video, IM, text, email, and virtual reality). The six modes of communication use eleven different applications 102: two voice applications 102 (from Companies A and E), two Instant Messaging applications 102 (from Companies B and E), three email applications 102 (from Companies B, C, and E), one text application (from Company A), two video applications (from Companies D and E), and one virtual reality application (from Company E).

The communication manager 121 determines if an electronic communication request has been received from the first party 103A to the second party 103B in step 204. The electronic communication request may include additional parties 103. If the electronic communication request has not been received in step 204, the process repeats step 204. Otherwise, if the electronic communication request has been received from the first party 103A to the second party 103B in step 204, the communication manager 121 selects, based on the a rule 123 for the first party 103A, a first communication endpoint 101 of the first party 103A (one of the communication endpoints 101-A1 to 101-A5) and a first communication application 102 of first party 103A (one of the eleven communication applications 102 of the first party 103A) in step 206. The communication manager 121 then establishes or attempts to establish the electronic communication using the first communication endpoint 101 of the first party 103A (one of 101 to A1-101-A5) of and the first communication application 102 of the first party 103A (one of the eleven applications of the first party 103A).

For example, assume that an electronic communication request has been received from the communication endpoint 101-A3 (the party 103A's cell phone (a company cell phone in this example)) to establish a voice communication session with the communication endpoint 101-B1 (the party 103B's cell phone). Based on a rule 123 that the party 103A must use a form of text communication if the party 103A is in an unsecure location, the communication manager 121 selects the IM application 102 (Company B's IM application) to establish an IM communication session with the party 103B at the communication endpoint 101-B1.

The rule(s) 123 for the first party 103A can vary based on administration preferences of the first party 103A. The first party 103A can have different rules 123 for different situations. For example, the first party 103A can define a rule 123 that when the first party 103A is in a noisy location, that an initial electronic communication request by the first party 103A to the second party 103B, which initially was a voice communication request, is rerouted to a text messaging application 102 of the first party 103A or an IM application 102 of the first party 103A.

Another rule 123 of the first party 103A can be based on determining that the first party 103A is on a mobile telephone 101 and is not connected to a WiFi connection. In response to determining that the first party 103A is on the mobile telephone 101 and is not connected to the WiFi connection, an initial electronic communication request from the first party 103A to the second party 103B, which initially was a video communication request, is rerouted to a voice communication application 102 of the first party 103A to save network usage.

Another rule 123 of the first party 103A can be based on determining that the first party 103A is on a mobile telephone 101 and is reaching a defined amount of network usage. In response to determining that the first party 103A is on the mobile telephone 101 and is reaching the defined amount of network usage, an electronic communication request from the first party 103A to the second party 103B, which initially was a video communication request, is rerouted to a voice communication application 102 of the first party 103A.

Another rule 123 of the first party 103A can be based on determining that the first party 103A is driving a vehicle. In response to determining that the first party 103A is driving the vehicle, an electronic communication request from the first party 103A to the second party 103B, which initially was a video communication request, is rerouted to a hands free voice communication application 102 of the first party 103A.

The rule 123 for the first party 103A may be based on the title of the first party 103A. For example, the call may be by a corporate attorney. The rule 123 requires all legal calls to be recorded. When the call is initiated by the corporate attorney, the call is transferred to the corporate attorney's conference bridge, recording is enabled, and the second party 103B is invited to join the bridge (e.g., via a click-to-call number or call dialout number depending on where the second party is available).

The rule 123 for the first party 103A may be based on the second party 103B having his/her picture in a contact list being updated periodically based snapshots being taken from the second party's 103B desktop camera in his/her office. When the first party 103A initiates a voice call, the mode is dynamically changed to video for the call based on the periodic snapshots. For example, if a face is detected in the recent snapshot indicating that the person is available on the desk.

In another embodiment, the first party 103A calls the second party on voice, but is upgraded to video because in the recent past, a number of calls from the first party 103A and/or second party 103B were upgraded to video. Similarly, for downgrading. Even though the rule 123 can upgrade/downgrade the call, the second party 103B can change the selection when answering the call.

FIG. 3 is a flow diagram of a process for selecting a communication endpoint 101 and a communication application 102 for a called party 103 in an electronic communication. Step 300 goes between steps 202 and 204 of FIG. 2. Step 302 of FIG. 3 goes between step 206 and 208 of FIG. 2.

After identifying the contact information 122 for the first party 103A in step 202, the communication manager 121 identifies contact information 122 for the second party 103B in step 300. For example, the contact information 122 for the second party 103B may be as defined in Table 1. In Table 1, the second party 103B has two communication endpoints 101-B1-101-B2. The second party 103B has five modes of communication (voice IM, email, text, and video). The five modes of communication use six different applications: one for voice (Company A), one for IM (Company A), two for email (Company A and Company B), one for text (Company A), and one for video (Company D). The process then goes to step 204.

After selecting, based on a rule 123 for the first party 103A, a first communication endpoint (one of the communication endpoints 101-A1 to 101-A5) of the first party 103A and a first communication application 102 of the first party 103A (one of the eleven applications of the first party 103A) in step 206, the communication manager 121, selects, based on a rule 123 for the second party 103B, a first communication endpoint 101 of the second party 103B (one of the communication endpoints 101-B1 to 101-B2) and a communication application 102 of the second party 103B (one of the six communication applications 102 of the second party 103B) in step 302.

The communication manager 121 then establishes or attempts to establish, in step 208, the electronic communication session using the selected communication endpoint 101 of the first party 103A (the selected one of the communication endpoints 101-A1 to 101-A5), the selected communication application 102 of the first party 103A (one of the eleven communication applications 102 of the first party 103A), the selected communication endpoint 101 of the second party 103B (one of the communication endpoints 101-B1 to 101-B2), and the selected communication application 102 of the second party 103B (one of the six communication applications 102 of the second party 103B).

The selected communication application 102 of the first party 103A and the selected the communication application 102 of the second party 103B may be the same communication application 102. For example, a voice call from the home phone 101-A1 of the first party 103A to the cell phone 101-B1 of the second party 103B may both use the same voice communication application 102 (e.g., the voice communication application of Company A).

Alternatively, the selected communication application 102 of the first party 103A may be different from the selected communication application 102 of the second party 103B. For example, a voice call from the home phone 101-A1 of the first party 103A to the cell phone 101-B1 of the second party 103B may use different communication applications 102. Moreover, the different communication applications 102 of the first party 103A and the second party 103B may use different media. For instance, a voice call from the first party 103A at the home phone 101-A1 may be converted to an IM session on the cell phone 101-B1 based on a rule 123 for the first and/or second party 103B.

The rule 123 for the second party 103B may be based on determining that the second party 103B is in a noisy location. In response to determining that the second party 103B is in the noisy location, the electronic communication request from the first party 103A to the second party 103B, which initially was a voice electronic communication request, is rerouted to a text messaging application 102 of the second party 103B or an IM application 102 of the second party 103B. In this example, the first party 103A may be requested to switch to the text session or IM session. Alternatively, the first party 103A may stay on the voice call while the second party 103B is on text or IM.

The rule 123 for the second party 103B may be based on determining that the second party 103B is not available for a voice conference call (e.g., a conference bridge called the second party, but the second party did not answer). In response to determining that the second party 103B is not available for the voice conference call, the electronic communication is rerouted to a voice recording application 102 that records the voice conference call for the second party 103B.

The rule 123 for the second party 103B may be based on determining that the second party 103B is in an unsecure location. In response to determining that the second party 103B is in the unsecure location, the electronic communication request, which initially was a voice electronic communication request from the first party 103A to the second party 103B, is rerouted to a text messaging application 102 of the second party 103B or an IM application 102 of the second party 103B. In this example, the first party 103A may be requested to switch to a text session or IM session. Alternatively, the first party 103A may stay on the voice call while the second party 103B is on text or IM.

The rule 123 for the second party 103B may be based on a calendar event that indicates the second party 103B is in a meeting. In response to determining that the second party 103B is in the meeting, the electronic communication request from the first party 103A to the second party 103B, which initially was a voice electronic communication request, is rerouted to a text messaging application 102 of the second party 103B or an IM application 102 of the second party 103B. In this example, the first party 103A may be requested to switch to a text session or IM session. Alternatively, the first party 103A may stay on the voice call while the second party 103B is on text or IM.

The rule 123 for the second party 103B may be based on a calendar event that indicates the second party 103B is not at work. In response to determining that the second party 103B is not at work, the electronic communication request from the first party 103A to the second party 103B, which initially was a voice communication request to a work telephone 101 of the second party 103B, is rerouted to a mobile telephone 101 of the second party 103B or a home phone 101 of the second party 103B.

The rule 123 for the second party 103B may be based on a calendar event that indicates the second party 103B is not at work. In response to determining that the second party 103B is not at work, the electronic communication request from the first party 103A to the second party 103B, which initially was an email communication request to the a work email of the second party 103B is rerouted to a personal email application 102 of the second party 103B.

The rule 123 for the second party 103B may be based on determining that the second party 103B is at work and that the electronic communication request is a voice call from a work associate to a mobile telephone of the second party 103B. In response to determining, that the second party 103B is at work and that the electronic communication request is the voice call from the work associate to the mobile telephone 101 of the second party 103B, the voice call from the work associate is rerouted to a work telephone of the second party 103B.

The rule 123 for the second party 103B may be based on determining that the electronic communication request is a voice call to the work telephone 101 of the second party 103B and that the second party 103B is in a meeting. In response to determining that the electronic communication request is a voice call to the work telephone 101 of the second party 103B and that the second party 103B is in the meeting, the voice call to the work telephone 101 of the second party 103B is rerouted to a text messaging application 102 of the second party 103B or an IM application 102 of the second party 103B on the mobile telephone 101 of the second party 103B. In this example, the first party 103A may be requested to switch to the text session or IM session.

Alternatively, the first party 103A may stay on the voice call while the second party 103B is on text or IM.

The rule 123 for the second party 103B may be based on determining that the second party 103B is driving a vehicle. In response to determining that the second party 103B is driving the vehicle, the electronic communication request from the first party 103A to the second party 103B, which initially was a video communication request, is rerouted to a hands free voice communication application 102 of the second party 103B.

The rule 123 for the second party 103B may be based on determining that the second party 103B is at home based on Global Positioning Satellite (GPS). In response to determining that the second party 103B is at home based on GPS, the electronic communication request from the first party 103A to the second party 103B, which initially was a communication request to a work communication application 102 of the second party 103B is rerouted to a home communication application 102 of the second party 103B.

The rule 123 for the second party 103B may be based on a calendar event that indicates the second party 103B is not at work. In response to determining that the second party 103B is not at work, the electronic communication request from the first party 103A to the second party 103B, which initially was an IM request to a work IM application 102 of the second party 103B is rerouted to a personal IM application 102 of the second party 103B.

The rule 123 for the second party 103B may be based on the second party 103B being present at a communication endpoint 101 that does not support video conferencing, and in response to the second party 103B being present at a communication endpoint 101 that does not support video conferencing, rerouting the electronic communication request from the first party 103A to the second party 103B, which initially was a video call request, to a virtual reality application 102 of the second party 103B.

The rule 123 for the second party 103B may be based on receiving a call in a time period. For example, if a video call goes to the second party's cell phone 101, and if not picked in few seconds, the user's work PC can also ring.

In another embodiment, the second party 103B receives a call from Human Resources (a confidential corporate call). Although the second party 103B is on corporate Virtual Private Network (VPN), the second party's 103B communication endpoint 101 supports split VPN, which could potentially cause part of the voice call to go outside the VPN. Since this is against corporate policy, any external relay servers are disabled for the call. If the call cannot be completed, the call gets downgraded to a text medium (e.g., email or IM).

The above descriptions describe rules 123 for the first party 103A and the second party 103B. In some embodiments, the rules 123 may be applied for both the first party 103A and the second party 103B. For example, the first party 102A may try to initiate a video call from his cell phone while driving. Based on a rule 123 of the first party 103A, the video call is switched to a hands free voice call. Based on a rule 123 of the second party 103B, which determines that the second party 103B is in a meeting, the voice communication session is rerouted to an IM session. The first party 103A communicates using voice and the second party 103B communicates using IM (via voice to text and text to voice conversion).

The rules 123 may also resolve conflicts between the rules 123 of the first party 103A and the rules 123 of the second party 103B. For example, a communication application 102 and/or communication endpoint 101 of a party 103 may have higher priority in the rules 123 based on a title of the party 103 or some other administered rule 123.

The above processes all relate to an initial communication request. However, in other embodiments, the communication manager 121 can change a communication session mid-stream based on one or more rules 123. For example, the communication manager 121 can determine that the first party 103A has entered a noisy location during the communication session. In response to determining that the first party 103A has entered the noisy location during the initial communication session, the communication manager 121 switches the communication session, which initially was a voice communication session, to a text messaging or an Instant Messaging communication session.

The communication manager 121 can determine that the first party 103A has entered an unsecure location during the communication session. In response to determining that the first party 103A has entered the unsecure location during the communication session, the communication manager 121 switches the communication session, which initially was the voice communication session, to a text messaging or an IM communication session.

The communication manager 121 can determine that the first party 103A is on a mobile telephone 101 and has as disconnected from a WiFi connection during a communication session. In response to determining that the first party 103A is on the mobile telephone 101 and has disconnected from the WiFi connection during the communication session, the communication manger 121 switches the communication session, which initially was a video communication session, to a voice communication session.

The communication manager 121 can determine that the first party 103A is on a mobile telephone 101 and has reached a defined amount of network usage during the communication session. In response to determining that the first party 103A is on the mobile telephone 101 and has reached the defined amount of network usage during the communication session, the communication manager 121 switches the communication session, which initially was the video communication session, to a voice communication session. Alternatively, the communication manager 121 could instruct the communication applications 102 on both sides to use lower bandwidth for the video communication session, which could result in changing the frame rate, capture resolution or other video encoder parameters.

The communication manager 121 can determine that the first party 103A has begun driving a vehicle during the communication session, and in response to determining that the first party 103A has begun driving the vehicle during the communication session, the communication manager 121 reroutes the communication session, which initially was the video communication session, to a hands free voice communication session.

The communication manager 121 can determine that an IM communication session has been established. During the IM communication session, one of the parties 103 shares a file via IM file sharing. Corporate policy requires all file sharing must be done via email or sharepoint, so the shared file get converted to an email with inline file attachment for a small file or link to sharepoint file for large files.

The rule 123 for the communication session may be based on what communication networks are available. For example, the default call mode can be dynamically updated for a communication to switch between video and voice as the network of one of the parties changes between wifi and cellular (e.g. 4G), respectively, based on the parties 103 rules 123.

The rule 123 for the communication session may be based on a calendar event for a conference call that occurs during the communication session. The conference call is to include the first party 103A, the second party 103B, and a third party 103C. The call from the first party 103A to the second party 103B is transferred to a conference bridge, with the third party 103C joining the conference call, and the first party 103A and the second party 103B being prompted to join the conference call. The transferred call may be a new call or an existing call request is rerouted. For a new call the communication manager 121 will prompt the first party 103A and the second party 103B to join the conference call.

FIG. 4 is a flow diagram of a process for exchanging contact information 122 between parties 103 (e.g. the parties 103A, 103B, and/or other parties 103). The process starts in 400. The process determines if the parties 103 agree to exchange all their contact information 122 in step 402. If the parties 103 agree to exchange all their contact information 122 in step 402, the parties 103 exchange all their contact information 122 in step 404 and the process ends in step 408. The contact information 122 may include not only the endpoint/mode/application information, but also context information, such as location, driving state, at work, at desk, or any other relevant information. Otherwise, if the parties 103 do not agree to exchange all their contact information 122 in step 402, the parties 103 only exchange the necessary contact information 122 in step 406 and the process ends in step 408.

For example, if the parties 102A and 102B agree to exchange all their contact information 122, based on a trusted relationship, in step 402, the parties 103A and 103B would exchange all their contact information 122 (e.g., all the parties 103A and 103B's contact information 122 in Table 1). By exchanging all the party's 103 contact information 122, a party 103 initiating a communication will have a greater probability of contacting the other party 103 if the initiating party 103 knows all the possible communication endpoints 101/communication application 102 of the other party(s) 103. The contact information 122 may also include the rules 123. By knowing the rules of the other party, the initiating party 103 may be more likely to be able to contact the other party 103. For example, if the initiating party 103A knows that the other party 103B is at a communication endpoint 101 that supports a medium that the initiating party 103A wants to use, based on the initiating party 103A's rules 123, then the initiating party 103A can initiate that call using that particular medium.

If the parties 103 do not agree to share contact information 122 in step 402, the parties 103 may only exchange the necessary contact information 122. For example, the called party 103 may only exchange an address for a particular medium based on the initiated call.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
identifying, by a processor, contact information of a first party, wherein the contact information of the first party defines a plurality of communication endpoints of the first party and a plurality of communication applications for the plurality of communication endpoints of the first party;
receiving, by the processor, an electronic communication request from the first party to a second party to establish an initial electronic communication session between the first party and the second party; and
in response to receiving the electronic communication request from the first party to the second party, selecting, by the processor and based on a rule for the first party, a first communication endpoint of the plurality of communication endpoints for the first party and a first communication application of the plurality of communication applications of the first party for use in the initial electronic communication session.

2. The method of claim 1 further comprising:
identifying contact information of the second party, wherein the contact information of the second party comprises a plurality of communication endpoints of the second party and a plurality of communication applications for the plurality of communication endpoints of the second party; and
selecting, based on a rule for the second party, a first communication endpoint of the plurality of communication endpoints for the second party and first communication application of the plurality of communication applications of the second party.

3. The method of claim 2, wherein the rule for the second party does at least one of:
determines that the second party is in a noisy location, and in response to determining that the second party is in the noisy location, rerouting the electronic communication request, which initially was a voice electronic communication request, to a text messaging application of the second party or an Instant Messaging application of the second party;
determines that the second party is not available for a voice conference call, and in response to determining that the second party is not available for the voice conference call, rerouting the electronic communication request to a voice recording application that records the voice conference call for the second party;
determines that the second party is in an unsecure location, and in response to determining that the second party is in the unsecure location, rerouting the electronic communication request, which initially was the voice electronic communication request, to the text messaging application of the second party or the Instant Messaging application of the second party;
determines, based on a first calendar event, that the second party is in a first meeting, and in response to determining that the second party is in the first meeting, rerouting the electronic communication request, which initially was the voice electronic communication request, to the text messaging application of the second party or the Instant Messaging application of the second party;
determines, based on a second calendar event, that the second party is not at work, and in response to determining that the second party is not at work, rerouting the electronic communication request, which initially was a voice communication request to a work telephone of the second party, to a mobile telephone of the second party, or a home phone of the second party;
determines, based on a third calendar event, that the second party is not at work, and in response to determining that the second party is not at work, rerouting the electronic communication request, which initially was an email communication request to a work email of the second party, to a personal email application of the second party;

determines that the second party is at work and that the electronic communication request is a voice call from a work associate to the mobile telephone of the second party, and in response to determining that the second party is at work and that the electronic communication request is the voice call from the work associate to the mobile telephone of the second party, rerouting the voice call from the work associate to the work telephone of the second party;

determines that the electronic communication request is a voice call to the work telephone of the second party and that the second party is in a second meeting, and in response to determining that the electronic communication request is the voice call to the work telephone of the second party and that the second party is in the second meeting, rerouting the voice call to the mobile telephone of the second party using the text messaging application of the second party or the Instant Messaging application of the second party on the mobile telephone of the second party;

determines that the second party is driving a vehicle, and in response to determining that the second party is driving the vehicle, rerouting the electronic communication request, which initially was a video communication request, to a hands free voice communication application of the second party;

determines that the second party is at home based on Global Positioning Satellite (GPS) and in response to determining that the second party is at home based on GPS, rerouting the electronic communication request, which initially was a communication request to a work communication application of the second party, to a home communication application of the second party;

determines, based on a fourth calendar event, that the second party is not at work, and in response to determining that the second party is not at work, rerouting the electronic communication request, which initially was an Instant Messaging (IM) request to a work IM application of the second party, to a personal IM application of the second party;

determines, based on the second party being present at a communication endpoint that does not support video conferencing, and in response to determining that the second party is present at a communication endpoint that does not support video conferencing, rerouting the electronic communication request from the first party to the second party, which initially was a video call request, to a virtual reality application of the second party;

determines, based on the second party receiving a video call in a time period, and in response to the second party receiving a video call in the time period, rerouting the electronic communication request if not answered in a number of seconds to a different communication endpoint; or determines, based on the second party receiving a confidential corporate call that the second party's communication endpoint supports a split Virtual Private Network (VPN), which could potentially cause the confidential corporate call to go outside the VPN, in response to the second party receiving the confidential corporate call, disabling any external relay servers for the confidential corporate call and if the confidential corporate call cannot be completed, the confidential corporate call is downgraded to a text medium.

4. The method of claim 2, wherein the plurality of communication endpoints for the first and/or second party comprises at least two of: a work telephone, a home telephone, a mobile telephone, a home personal computer, a work personal computer, a home video phone, a work video phone, a mobile video phone, a pager, and a personal digital assistant.

5. The method of claim 2, wherein the plurality of communication applications for the plurality of communication endpoints of the first party and/or the second party comprises at least two of: a work voice application, a home voice application, a mobile telephone voice application, a work video application, a home video application, a mobile video application, an work email application, a personal email application, a mobile email application, a work text messaging application, a home text messaging application, a mobile text messaging application, a work Instant Messaging (IM) application, a home IM application, a mobile IM application, and a work multimedia application, a home multimedia application, a mobile multimedia application, a work virtual reality application, a mobile virtual reality application, a home virtual reality application, a paging application, a FAX application, an Interactive Voice Response application, a voice mail application, and a conference bridge.

6. The method of claim 2, wherein the first party exchanges the contact information of the first party with the second party and wherein the second party exchanges the contact information of the second party with the first party.

7. The method of claim 6, wherein the first party and the second party agree to exchange all of first and the second party's known communication endpoints and all of first and second party's known communication applications.

8. The method of claim 2, wherein the electronic communication request establishes the initial communication session and wherein the rule for the second party does at least one of:

determines that the second party entered a noisy location, and in response to determining that the second party entered the noisy location, switching the initial communication session, which initially was a voice communication session, to a text messaging or an Instant Messaging communication session;

determines that the second party is not available for a portion of a voice conference call, and in response to determining that the second party is not available for the portion of the voice conference call, recording the portion of voice conference call for the second party;

determines that the first party has entered an unsecure location, and in response to determining that the first party has entered the unsecure location, switching the initial communication session, which initially was the voice communication session, to the text messaging or the Instant Messaging communication session;

determines, based on a first calendar event, that the second party has entered a meeting, and in response to determining that the second party has entered the meeting, switching the initial communication session, which initially was the voice communication session, to the text messaging or the Instant Messaging communication session;

determines that the second party has started driving a vehicle, and in response to determining that the second party started driving the vehicle, switching the initial communication session, which initially was a video communication session, to a hands free voice communication session;
determines that during the initial communication session, which is an Instant Messaging communication session, one of the first or second parties shares a file via Instant Messaging file sharing and in response to the one of the first or second party sharing the file via Instant Messaging file sharing, converting the file to an email; or
determines that during the initial communication session, which is a voice communication session, that there is a second calendar event of a conference call that includes the first party, the second party, and a third party, in response to the second calendar event, the initial communication session is transferred to a conference bridge, with the third party joining the conference call.

9. The method of claim 1, wherein the rule for the first party does at least one of:
determines that the first party is in a noisy location, and in response to determining that the first party is in the noisy location, rerouting the electronic communication request, which initially was a voice communication request, to a text messaging application of the first party or an Instant Messaging application of the first party;
determines that the first party is in an unsecure location, and in response to determining that the first party is in the unsecure location, rerouting the electronic communication request, which initially was the voice communication request, to the text messaging application of the first party or the Instant Messaging application of the first party;
determines that the first party is on a mobile telephone and is not connected to a WiFi connection, and in response to determining that the first party is on the mobile telephone and is not connected to the WiFi connection, rerouting the electronic communication request, which initially was a video communication request, to a voice communication application of the first party;
determines that the first party is on the mobile telephone and is reaching a defined amount of network usage, and in response to determining that the first party is on the mobile telephone and is reaching the defined amount of network usage, rerouting the electronic communication request, which initially was the video communication request, to the voice communication application of the first party;
determines that the first party is driving a vehicle, and in response to determining that the first party is driving the vehicle, rerouting the electronic communication request, which initially was the video communication request, to a hands free voice communication application of the first party;
determines that a title of the first party requires that the initial communication session be recorded, in response to determining that the title of the first party requires recording of the initial communication session, the electronic communication request is transferred to the first party's conference bridge, recording is enabled, and the second party is invited to join the conference bridge;
determines that the second party's picture, in a contact list, is being updated periodically based on snapshots being taken from the second party's desktop, in response to the second party's picture in the contact list being updated periodically, rerouting the electronic communication request, which was initially the voice communication request, to a video communication application of the first party; or
determines that a number of previous calls from the first party and/or the second party were upgraded to video, in response to determining that the number of previous calls from the first party and/or the second party were upgraded to video, rerouting the electronic communication request, which was initially the voice communication request to the video communication application of the first party.

10. The method of claim 1, wherein the electronic communication request establishes the initial communication session and wherein the rule for the first party does at least one of:
determines that the first party has entered a noisy location, and in response to determining that the first party has entered the noisy location, switching the initial communication session, which initially was a voice communication session, to a text messaging or an Instant Messaging communication session;
determines that the first party has entered an unsecure location, and in response to determining that the first party has entered the unsecure location, switching the initial communication session, which initially was the voice communication session, to the text messaging or the Instant Messaging communication session;
determines that the first party is on a mobile telephone and has disconnected from a WiFi connection, and in response to determining that the first party is on the mobile telephone and has disconnected from the WiFi connection, switching the initial communication session, which initially was a video communication session, to a voice communication session;
determines that the first party is on the mobile telephone and has reached a defined amount of network usage, and in response to determining that the first party is on the mobile telephone and has reached the defined amount of network usage, switching the initial communication session, which initially was the video communication session, to a voice communication session; or
determines that the first party has begun driving a vehicle, and in response to determining that the first party has begun driving the vehicle, rerouting the initial communication session, which initially was the video communication session, to a hands free voice communication session.

11. A communication system comprising:
a microprocessor; and
a computer readable medium, coupled with the microprocessor and comprising microprocessor readable and executable instructions that cause the microprocessor to execute:
a communication manager that identifies contact information of a first party, wherein the contact information of the first party defines a plurality of communication endpoints of the first party and a plurality of communication applications for the plurality of communication endpoints of the first party, receives an electronic communication request from the first party to a second party to establish an initial electronic communication session between the first party and the second party, and selects, based on a rule for the first party, a first communication endpoint of the plurality of communication endpoints for the first party and a first communication application of the plurality of communication applications of the first party for use in the initial electronic communication session in response to receiving the electronic communication request from the first party to the second party.

12. The system of claim 11 wherein the communication manager identifies contact information of the second party, wherein the contact information of the second party comprises a plurality of communication endpoints of the second party and a plurality of communication applications for the plurality of communication endpoints of the second party and selects, based on a rule for the second party, a first communication endpoint of the plurality of communication endpoints for the second party and first communication application of the plurality of communication applications of the second party.

13. The system of claim 12, wherein the rule for the second party does at least one of:
   determines that the second party is in a noisy location, and in response to determining that the second party is in the noisy location, rerouting the electronic communication request, which initially was a voice electronic communication request, to a text messaging application of the second party or an Instant Messaging application of the second party;
   determines that the second party is not available for a voice conference call, and in response to determining that the second party is not available for the voice conference call, rerouting the electronic communication request to a voice recording application that records the voice conference call for the second party;
   determines that the second party is in an unsecure location, and in response to determining that the second party is in the unsecure location, rerouting the electronic communication request, which initially was the voice electronic communication request, to the text messaging application of the second party or the Instant Messaging application of the second party;
   determines, based on a first calendar event, that the second party is in a first meeting, and in response to determining that the second party is in the first meeting, rerouting the electronic communication request, which initially was the voice electronic communication request, to the text messaging application of the second party or the Instant Messaging application of the second party;
   determines, based on a second calendar event, that the second party is not at work, and in response to determining that the second party is not at work, rerouting the electronic communication request, which initially was a voice communication request to a work telephone of the second party, to a mobile telephone of the second party or a home phone of the second party;
   determines, based on a third calendar event, that the second party is not at work, and in response to determining that the second party is not at work, rerouting the electronic communication request, which initially was an email communication request to the a work email of the second party, to a personal email application of the second party;
   determines that the second party is at work and that the electronic communication request is a voice call from a work associate to the mobile telephone of the second party, and in response to determining, that the second party is at work and that the electronic communication request is the voice call from the work associate to the mobile telephone of the second party, rerouting the voice call from the work associate to the work telephone of the second party;
   determines that the electronic communication request is a voice call to the work telephone of the second party and that the second party is in a second meeting, and in response to determining that the electronic communication request is the voice call to the work telephone of the second party and that the second party is in the second meeting, rerouting the voice call to the mobile telephone of the second party using the text messaging application of the second party or the Instant Messaging application of the second party on the mobile telephone of the second party;
   determines that the second party is driving a vehicle, and in response to determining that the second party is driving the vehicle, rerouting the electronic communication request, which initially was a video communication request, to a hands free voice communication application of the second party;
   determines that the second party is at home based on Global Positioning Satellite (GPS) and in response to determining that the second party is at home based on GPS, rerouting the electronic communication request, which initially was a communication request to a work communication application of the second party, to a home communication application of the second party;
   determines, based on a fourth calendar event, that the second party is not at work, and in response to determining that the second party is not at work, rerouting the electronic communication request, which initially was an Instant Messaging (IM) request to a work IM application of the second party, to a personal IM application of the second party;
   determines, based on the second party being present at a communication endpoint that does not support video conferencing, and in response to determining that the second party is present at a communication endpoint that does not support video conferencing, rerouting the electronic communication request from the first party to the second party, which initially was a video call request, to a virtual reality application of the second party;
   determines, based on the second party receiving a video call in a time period, and in response to the second party receiving a video call in the time period, rerouting the electronic communication request if not answered in a number of seconds to a different communication endpoint; or
   determines, based on the second party receiving a confidential corporate call that the second party's communication endpoint supports a split Virtual Private Network (VPN), which could potentially cause the confidential corporate call to go outside the VPN, in response to the second party receiving the confidential corporate call, disabling any external relay servers for the confidential corporate call and if the confidential corporate call cannot be completed, the confidential corporate call is downgraded a text medium.

14. The system of claim 12, wherein the plurality of communication endpoints for the first and/or second party comprises at least two of: a work telephone, a home telephone, a mobile telephone, a home personal computer, a work personal computer, a home video phone, a work video phone, a mobile video phone, a pager, and a personal digital assistant.

15. The system of claim 12, wherein the plurality of communication applications for the plurality of communication endpoints of the first party and/or the second party comprises at least two of: a work voice application, a home voice application, a mobile telephone voice application, a work video application, a home video application, a mobile video application, an work email application, a personal email application, a mobile email application, a work text messaging application, a home text messaging application, a mobile text messaging application, a work Instant Messaging (IM) application, a home IM application, a mobile IM application, and a work multimedia application, a home multimedia application, a mobile multimedia application, a work virtual reality application, a mobile virtual reality application, a home virtual reality application, a paging application, a FAX application, an Interactive Voice Response application, a voice mail application, and a conference bridge.

16. The system of claim 12, wherein the first party and the second party agree to exchange all of first and the second party's known communication endpoints and all of first and second party's known communication applications.

17. The system of claim 12, wherein the electronic communication request establishes the initial communication session and wherein the rule for the second party does at least one of:
   determines that the second party entered a noisy location, and in response to determining that the second party entered the noisy location, switching the initial communication session, which initially was a voice communication session, to a text messaging or an Instant Messaging communication session;
   determines that the second party is not available for a portion of a voice conference call, and in response to determining that the second party is not available for the portion of the voice conference call, recording the portion of voice conference call for the second party;
   determines that the first party has entered an unsecure location, and in response to determining that the first party has entered the unsecure location, switching the initial communication session, which initially was the voice communication session, to the text messaging or the Instant Messaging communication session;
   determines, based on a calendar event, that the second party has entered a meeting, and in response to determining that the second party has entered the meeting, switching the initial communication session, which initially was the voice communication session, to the text messaging or the Instant Messaging communication session;
   determines that the second party has started driving a vehicle, and in response to determining that the second party started driving the vehicle, switching the initial communication session, which initially was a video communication session, to a hands free voice communication session;
   determines that during the initial communication session, which is an Instant Messaging communication session, one of the first or second parties shares a file via Instant Messaging file sharing and in response to the one of the first or second party sharing the file via Instant Messaging file sharing, converting the file to an email; or
   determines that during the initial communication session, which is a voice communication session, that there is a second calendar event of a conference call that includes the first party, the second party, and a third party, in response to the second calendar event, the initial communication session is transferred to a conference bridge, with the third party joining the conference call.

18. The system of claim 11, wherein the rule for the first party does at least one of:
   determines that the first party is in a noisy location, and in response to determining that the first party is in the noisy location, rerouting the electronic communication request, which initially was a voice communication request, to a text messaging application of the first party or an Instant Messaging application of the first party;
   determines that the first party is in an unsecure location, and in response to determining that the first party is in the unsecure location, rerouting the electronic communication request, which initially was the voice communication request, to the text messaging application of the first party or the Instant Messaging application of the first party;
   determines that the first party is on a mobile telephone and is not connected to a WiFi connection, and in response to determining that the first party is on the mobile telephone and is not connected to the WiFi connection, rerouting the electronic communication request, which initially was a video communication request, to a voice communication application of the first party;
   determines that the first party is on the mobile telephone and is reaching a defined amount of network usage, and in response to determining that the first party is on the mobile telephone and is reaching the defined amount of network usage, rerouting the electronic communication request, which initially was the video communication request, to the voice communication application of the first party;
   determines that the first party is driving a vehicle, and in response to determining that the first party is driving the vehicle, rerouting the electronic communication request, which initially was the video communication request, to a hands free voice communication application of the first party;
   determines that a title of the first party requires that the initial communication session be recorded, in response to determining that the title of the first party requires recording of the initial communication session, the electronic communication request is transferred to the first party's conference bridge, recording is enabled, and the second party is invited to join the conference bridge;
   determines that the second party's picture, in a contact list, is being updated periodically based on snapshots being taken from the second party's desktop, in response to the second party's picture in the contact list being updated periodically, rerouting the electronic communication request, which was initially the voice communication request, to a video communication application of the first party; or
   determines that a number of previous calls from the first party and/or the second party were upgraded to video, in response to determining that the number of previous calls from the first party and/or the second party were upgraded to video, rerouting the electronic communication request, which was initially the voice communication request to the video communication application of the first party.

19. The system of claim 11, wherein the electronic communication request establishes the initial communication session and wherein the rule for the first party does at least one of:
   determines that the first party has entered a noisy location, and in response to determining that the first party has entered the noisy location, switching the initial communication session, which initially was a voice communication session, to a text messaging or an Instant Messaging communication session;

determines that the first party has entered an unsecure location, and in response to determining that the first party has entered the unsecure location, switching the initial communication session, which initially was the voice communication session, to the text messaging or the Instant Messaging communication session;

determines that the first party is on a mobile telephone and has disconnected from a WiFi connection, and in response to determining that the first party is on the mobile telephone and has disconnected from the WiFi connection, switching the initial communication session, which initially was a video communication session, to a voice communication session;

determines that the first party is on the mobile telephone and has reached a defined amount of network usage, and in response to determining that the first party is on the mobile telephone and has reached the defined amount of network usage, switching the initial communication session, which initially was the video communication session, to a voice communication session; or determines that the first party has begun driving a vehicle, and in response to determining that the first party has begun driving the vehicle, rerouting the initial communication session, which initially was the video communication session, to a hands free voice communication session.

* * * * *